United States Patent [19]

Bittle

[11] 4,350,120
[45] Sep. 21, 1982

[54] AUTOMATIC FEEDER FOR ANIMALS

[76] Inventor: L. Gordon Bittle, 141 Syracuse Walk, Long Beach, Calif. 90803

[21] Appl. No.: 257,733

[22] Filed: Apr. 27, 1981

[51] Int. Cl.³ .............................................. A01K 5/02
[52] U.S. Cl. .................................. 119/51.13; 221/90; 221/270
[58] Field of Search .............. 119/51.11, 51.13, 51 R; 221/88, 90, 268, 270, 272

[56] References Cited

U.S. PATENT DOCUMENTS

| | | | |
|---|---|---|---|
| 2,585,371 | 2/1952 | Coffing | 119/51.13 X |
| 3,556,343 | 1/1971 | Ungerman | 221/90 |
| 3,767,081 | 10/1973 | Wittern | 221/90 |
| 3,802,601 | 4/1974 | Ohno | 221/90 |
| 4,284,206 | 8/1981 | Wittern | 221/90 |

FOREIGN PATENT DOCUMENTS 2015860  9/1979  United Kingdom ............. 119/51.13

Primary Examiner—Gene Mancene
Assistant Examiner—Robert P. Swiatek
Attorney, Agent, or Firm—Francis X. LoJacono

[57] ABSTRACT

An automatic feeder for animals adapted to dispense packaged food at a preset time, wherein the automatic feeder comprises an elongated vertical housing having a plurality of storage bins defined by a movable shelf selectively operated to drop stored food packages by means of a solenoid-operated ejector carriage which is mounted to a vertical track and supported in position by a retainer member adjacent each storage bin. The solenoid is activated by a timing device, causing the ejector to work its way down from the top of the housing and sequentially push each movable shelf to a discharge position, thus allowing each package to drop down a chute and engage cutting blades located adjacent the bottom of the chute, so as to release the food from the package for consumption.

8 Claims, 3 Drawing Figures

AUTOMATIC FEEDER FOR ANIMALS

BACKGROUND OF THE INVENTION

1. Field of the Invention

This invention relates to an animal feeder, and more particularly to an automatic food-dispensing feeder for animals.

2. Description of the Prior Art

It is well known in the art that various problems and difficulties are still being encountered in providing suitable means for feeding animals—particularly a house pet such as a dog, when the animal is left alone for a considerable length of time.

Several devices have been used to solve this problem; however, most of these devices include features that restrict their use, or do not allow the food to be stored in a manner to keep it in a fresh uncontaminated condition.

Some of these known devices are disclosed in U.S. Pat. Nos. 3,861,357; 4,044,722; 1,442,382 and 2,585,371.

SUMMARY AND OBJECTS OF THE INVENTION

The present invention provides an automatic food dispensing apparatus for animals that is adapted to store and selectively dispense individual rations of packaged food at a preset time at least once a day, whereby a package of food is ejected and cut open so that the food is released only at the time it is to be consumed by the animal.

Thus, it is an object of the invention to provide an automatic feeder for animals, particularly house pets, wherein single packages of food are stored in a series of bins arranged as a contiguous vertical stack of movable shelves which are individually pushed to release a package of food by means of an ejector carriage that is moved in a downward direction by means of a track and a retainer device, so that the carriage is sequentially positioned adjacent each succeeding bin from which a package of food is to be discharged.

Still another object of the invention is to provide an automatic feeder for animals that includes a twenty-four-hour cycle timing device that operates a solenoid mounted to the ejector carriage, whereby the carriage is provided with a longitudinal reciprocating action to move between the retainer and the shelf of the adjacent bin, thus allowing the carriage to drop down and become aligned with the next bin.

It is another object of the invention to provide an apparatus of this character that provides a means for cutting open the package of food as it is discharged from the bottom of the chute, so as to release the food for consumption.

It is a further object of the invention to provide an animal feeder of this type that can be set to operate for several days of feeding, without the need to be watched or manually operated, since it performs for a given period of time to dispense food automatically accordingly to the setting of the timing device.

It is still another object of the invention to provide an apparatus of this character that is composed of relatively few operating parts, and that is easy to service and maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
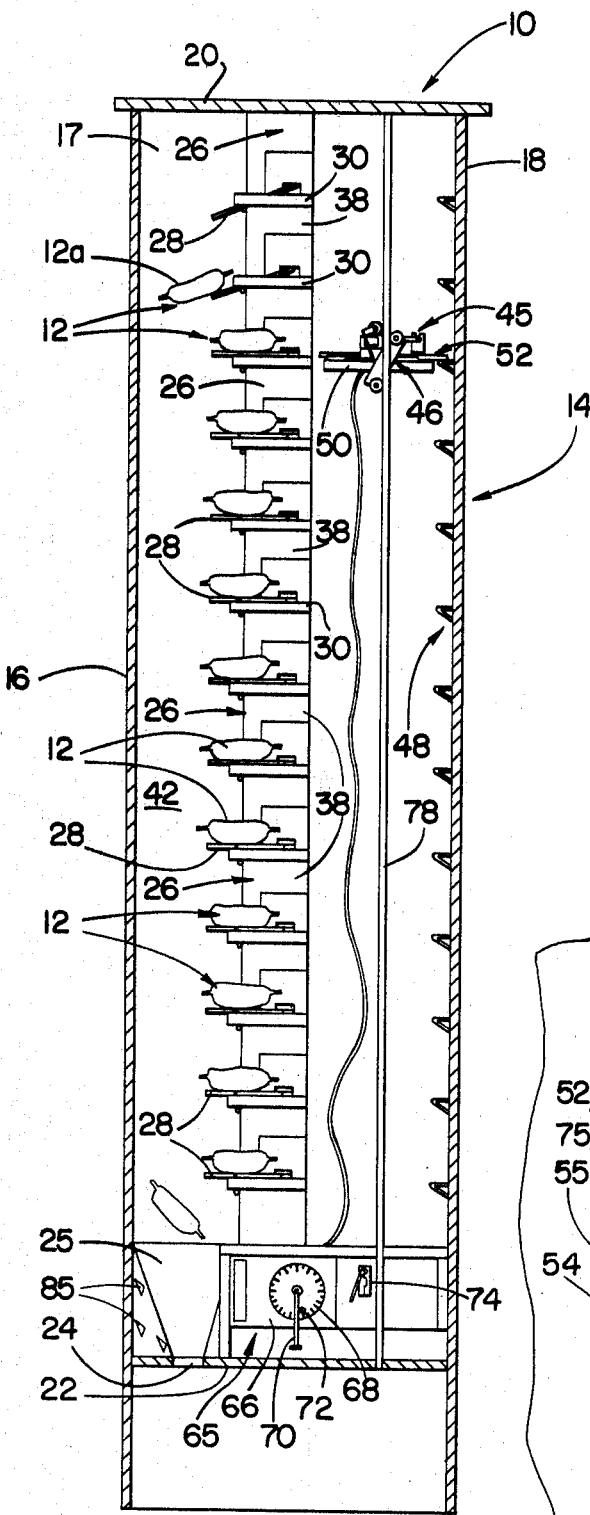
FIG. 1 is a longitudinal cross section of the automatic feeding apparatus showing the various dispensing and operating steps.
Figure 2:
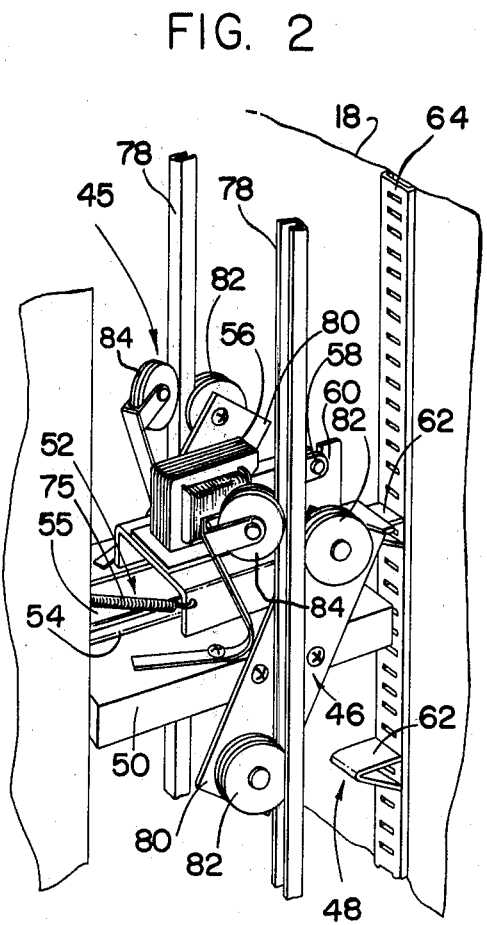
FIG. 2 is a pictorial view of the reciprocating carriage and the cooperating retaining means.

Referring more particularly to FIG. 1, there is shown an automatic animal-food dispenser, generally indicated at 10. This food dispenser can be made suitable for any type of domestic house pet—particularly cats and dogs, since their food is generally packaged as individual portions in sealed plastic bags, as indicated at 12.

The automatic food dispenser comprises a vertically elongated housing 14 having front, side and rear walls 16, 17 and 18, respectively, the housing being generally closed at the top by cover 20, and the bottom being closed by wall 22 which includes an outlet aperture 24 forming part of the discharge chamber 25.

Within housing 14 there is provided a plurality of storage bins 26 contiguously arranged one above the other. Each bin includes a movable shelf 28. These shelves can be flat members as shown, or can be box-like containers each having a front open end. Shelves 28 are slidably supported on side runners 30 affixed on opposite sides of each bin.

Figure 3:
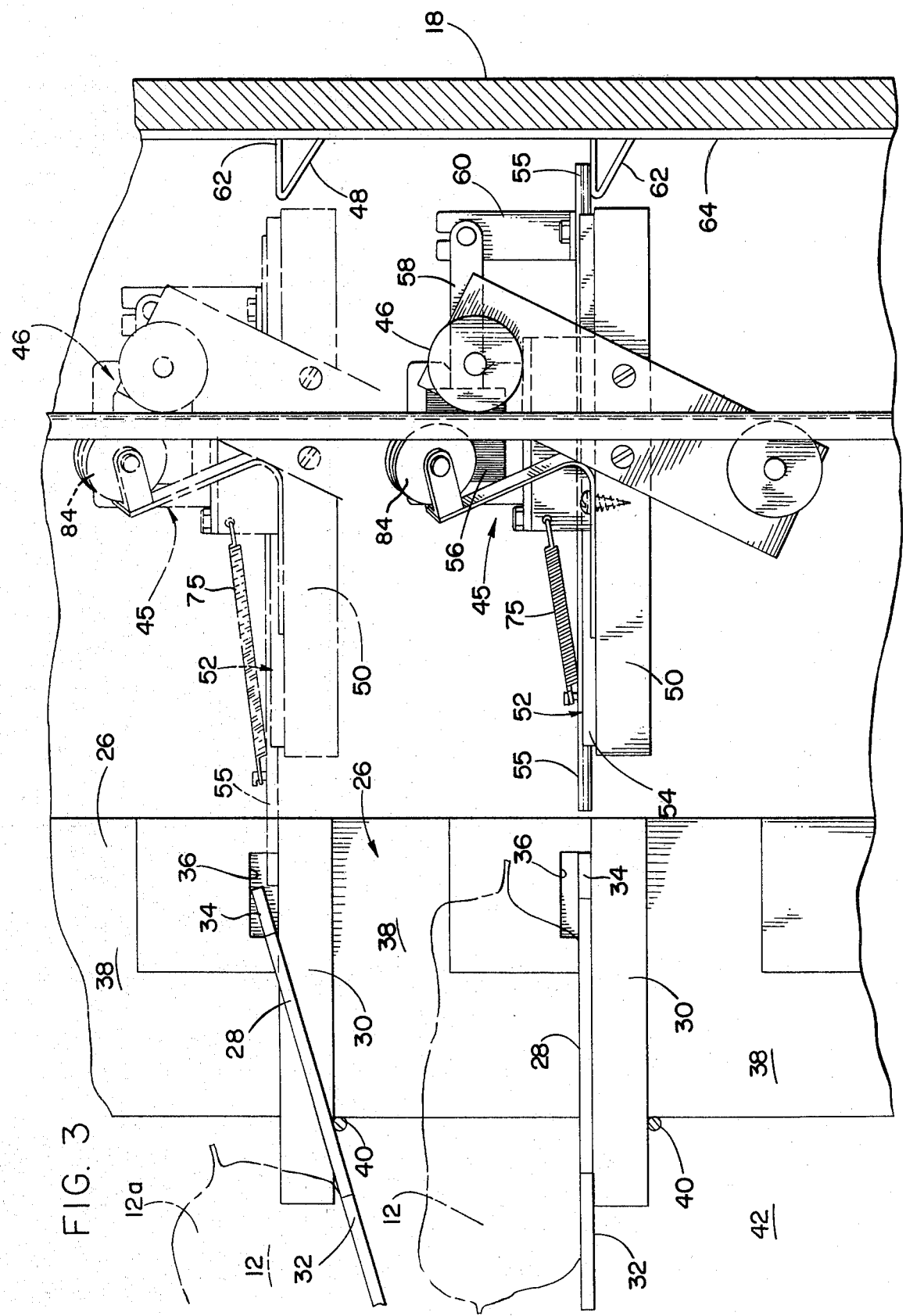
FIG. 3 is an enlarged cross-sectional view showing the position of the ejector carriage locked into a ready position (full lines), and the ejector carriage (in phantom lines) engaging the movable shelf of one of the storage bins.

Each shelf is formed having oppositely extending front leg members 32 and rear leg members 34. The leg members 32 and 34 are supported by runners 30, the front leg members 32 being free to be forced off the front of runners 30, as seen in FIG. 3. The rear leg members are retained in slot 36 formed in the side walls 38 of bin 26, which together define a pivot means for each shelf. Hence, when shelf 32 is moved forwardly, legs 32 will slip off runners 30, the rear legs 34 being moved forwardly in slot 36 and allowing shelf 28 to pivot downwardly—thus resting against stop means 40, which is shown as a rod traversing the opening between runners 30. When front legs 32 disengage runners 30, the packaged food will slide off shelf 28 and fall down the chute 42. (See package 12a in FIG. 1 and 12a in FIG. 3.)

Accordingly, in order to operate or move each shelf in a sequential order, there is provided an ejector means, generally indicated at 45, which includes vertical guide means 46 and a retainer means 48.

The ejector means 45 comprises a platform 50 that is adapted to be secured and moved vertically up and down on the vertical guide means 46. Supported on platform 50 is an ejector carriage 52 which comprises a two-part slide mechanism having a fixed slide member 54 and a longitudinal movable slide member 55. Slide member 55 is reciprocally slidable within fixed slide member 54 by means of solenoid 56, wherein armature 58 is operably attached to slide member 55 by link 60.

Thus, movable slide member 55, when in a normal inactive mode as seen in FIG. 3, forms part of the retainer means 48 by engaging in a locking arrangement with retainer tongue 62, the retainer tongue being adjustable along the support column 64 affixed to rear wall 18.

A timing means 65 is operably connected to solenoid 56, and can be set to actuate armature 58 at any selected time during a given period or day. The timing means 65 comprises a timer 66 having a timer wheel 68 and a centrally mounted pendulum 70 pushed by stop pin 72 as wheel 68 rotates clockwise. When pendulum 70 passes over the upper center point, it will drop and actuate spring-loaded microswitch 74. At this time, solenoid 56 is energized, thus causing armature 56 to retract slide 55 and release the locked end from tongue 62—in turn causing the front end thereof to engage the oppositely disposed shelf 28, and projecting it forwardly to release front legs 32, as previously described. Slide member 55 is then immediately returned by spring means 75, so that the rear end of member 55 catches the lower retainer tongue 62.

The carriage assembly will come to rest opposite the next lower bin by riding down the guide means 46 which comprises a pair of oppositely disposed vertical rails 78 on which a plurality of wheels are mounted. Secured to each side of platform 50 is a bar 80 having a pair of wheels 82 arranged to engage rails 78. Additional spring-loaded wheels 84 are mounted between platform 50 and each rail. Guide means 46 allows the carriage assembly to ride up and down along the guide means.

After a package of food 12 is released from a bin, it will drop down chute 42 defined between the bin and the front wall 16. Package 12 engages a cutting means defined by a plurality of cutting blades 85 located in discharge chamber 25. When the package discharges through aperture 24 in the bottom wall 22, it is sufficiently opened to allow the animal to freely reach the released food.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An automatic feeder for animals, the feeder adapted to dispense packaged food and comprising:
   a housing having a chute and a discharge chamber positioned at the lower end of said chute;
   a plurality of contiguously stacked bins adapted to receive said packaged food therein;
   a dispensing shelf movably supported in each of said bins;
   an ejector means mounted in said housing for sequential ejection of each of said dispensing shelves, in order to selectively discharge said packaged food at a given time;
   a retainer means positioned to engage said ejector means, and to align said ejector means with said dispensing shelf in order to engage said shelf;
   said ejector means including a guide means to guide said ejector means for vertical movement between said bins and said retainer means, and to align said ejector means horizontally with respect to said movable shelves; and
   wherein said ejector means comprises:
   a horizontally positioned platform interconnected to said guide means;
   an ejector carriage mounted to said platform, one end thereof being positioned to engage said movable shelf and the opposite end thereof being positioned to engage said retainer means; and
   actuating means connected to said ejector carriage to actuate said ejector carriage;
   a timing means operably connected to said ejector means to activate said ejector means, at a selected time period; and
   means disposed in said discharge chamber to open said packaged food as said package passes therethrough.

2. An automatic feeder as recited in claim 1, wherein said ejector carriage comprises:
   a first slide member affixed to said platform; and
   a second slide member slidably mounted to said first slide member, wherein one end of said second slide member is adapted to engage said retainer means and the opposite end thereof is adapted to engage and move said shelf of said bin to a dispensing position.

3. An automatic feeder as recited in claim 2, wherein said retainer means comprises a plurality of retainer-tongue members adjustably mounted to said housing, in order to retain said ejector means in alignment with said respective bin having a food package therein to be dispensed.

4. An automatic feeder as recited in claim 2, wherein said actuating means comprises:
   a solenoid having a movable armature interconnected to said second slide member, in order to cause movement of said second slide member in one direction, and to release and engage said movable shelf; and
   a spring-biased member to return said second slide member to a latched position adjacent the succeeding lower bin.

5. An automatic feeder as recited in claim 4, wherein said guide means comprises:
   a pair of vertically disposed guide rails, said ejector means being positioned therebetween; and
   a plurality of guide wheels supported by said platform for engagement with said rails.

6. An automatic feeder as recited in claim 5, wherein said timing means comprises:
   a timer having a timer wheel;
   a pendulum centrally mounted to said timer wheel; and
   a switch positioned adjacent said timer, whereby said pendulum engages said switch when rotated with said wheel.

7. An automatic feeder as recited in claim 4, wherein said means for opening said food package comprises a plurality of cutting blades mounted in said discharge chamber.

8. An automatic feeder as recited in claim 2, wherein:

each of said bins includes oppositely disposed runner members adapted to support said respective shelves thereon;

each of said shelves includes a pair of laterally disposed front legs and a pair of laterally disposed rear legs, said front legs being adapted to engage said runners and said rear legs being movably pivoted within said bin; and a stop means is included to limit the downward rotation of said shelves when said front legs are disengaged from said runners.

* * * * *